US012797954B2

(12) United States Patent
Gebel

(10) Patent No.: US 12,797,954 B2
(45) Date of Patent: Nov. 17, 2026

(54) PRODUCTION SYSTEM

(71) Applicant: TUSAS-TURK HAVACILIK VE UZAY SANAYII ANONIM SIRKETI, Ankara (TR)

(72) Inventor: Muhammed Enes Gebel, Ankara (TR)

(73) Assignee: TUSAS—TURK HAVACILIK VE UZAY SANAYII ANONIM SIRKETI, Ankara (TR)

( * ) Notice: Subject to any disclaimer, the term of this patent is extended or adjusted under 35 U.S.C. 154(b) by 482 days.

(21) Appl. No.: 18/535,235

(22) Filed: Dec. 11, 2023

(65) Prior Publication Data

US 2024/0216994 A1 Jul. 4, 2024

(30) Foreign Application Priority Data

Dec. 29, 2022 (TR) ............................... 2022/021311

(51) Int. Cl.
*B22F 10/50* (2021.01)
*B22F 10/22* (2021.01)
(Continued)

(52) U.S. Cl.
CPC .............. *B22F 10/50* (2021.01); *B22F 10/22* (2021.01); *B22F 10/25* (2021.01); *B22F 12/226* (2021.01);
(Continued)

(58) Field of Classification Search
CPC .......... B22F 10/50; B22F 10/22; B22F 10/25; B22F 12/226; B22F 12/37; B22F 2202/05; B22F 2998/10; B22F 10/38; B22F 10/368; B33Y 30/00; B33Y 40/00; B33Y 10/00; B23K 5/18; B23K 9/04; B23K 9/042;
(Continued)

(56) References Cited

U.S. PATENT DOCUMENTS

| | | | | |
|---|---|---|---|---|
| 2009/0047439 A1* | 2/2009 | Withers | .................. | B22F 10/38 118/620 |
| 2021/0001400 A1* | 1/2021 | Ren | ....................... | B22F 3/1028 |

FOREIGN PATENT DOCUMENTS

| | | | |
|---|---|---|---|
| CN | 102950285 A | 3/2013 | |
| CN | 105798299 A | 7/2016 | |
| WO | WO-2020089548 A1 * | 5/2020 | ......... B23K 15/0093 |

OTHER PUBLICATIONS

Cole, section V, history of system claims, NTP v. RIM: The Diverging Law Between System and Method Claim Infringement, Pierce Law Review, vol. 5, No. 2 pp. 347-365, 2007 (Year: 2007).*

* cited by examiner

*Primary Examiner* — Rebecca Janssen
(74) *Attorney, Agent, or Firm* — Notaro, Michalos & Zaccaria P.C.

(57) ABSTRACT

A production system has a device that enables application of a metal additive manufacturing production method and a welding process. A feeder on the device enables deposition of a raw material for use in the metal additive manufacturing production method. A heat source on the device enables the raw material provided by the feeder to be melted. A table allows the raw material to be processed thereon. A molten pool is formed by the raw material melted on the table by the heat source. A part is formed by melting the raw material on the table by the heat source and by creating a molten pool for processing the same. A plurality of magnetic generators on the device provide improvement in micro and/or macro structure of the part by applying a magnetic field on the part.

10 Claims, 2 Drawing Sheets

(51) Int. Cl.
*B22F 10/25* (2021.01)
*B22F 12/00* (2021.01)
*B22F 12/37* (2021.01)
*B33Y 30/00* (2015.01)
*B33Y 40/00* (2020.01)

(52) U.S. Cl.
CPC ............... *B33Y 30/00* (2014.12); *B33Y 40/00* (2014.12); *B22F 12/37* (2021.01); *B22F 2202/05* (2013.01)

(58) Field of Classification Search
CPC ........ B23K 9/044; B23K 9/046; B23K 9/048; B23K 10/027; B23K 11/0013; B23K 15/0086; B23K 20/1215; B23K 25/005; B23K 26/34; B23K 26/342
See application file for complete search history.

PRODUCTION SYSTEM

CROSS-REFERENCE TO RELATED APPLICATIONS

This patent application claims the benefit and priority of Turkish Patent Application No. 2022/021311, filed on Dec. 29, 2022, the disclosure of which is incorporated by reference herein in its entirety as part of the present disclosure.

FIELD

The present invention relates to a production method used in metal additive manufacturing production methods.

BACKGROUND

Directed Energy Deposition, one of the metal additive manufacturing production methods, includes laser, arc, etc. melting methods. These methods basically create an arc through non-melting or melting electrodes. By means of this arc, heat and mass transfer is carried out towards the molten pool, so that a stacking process is performed. The resulting arc can be directed by the magnetic effect. While the constant magnetic field is used to increase penetration, the variable magnetic field provides oscillation of the arc. While the constant magnetic field affects the molten pool in shape, the variable magnetic field creates different physical effects in the weld pool. Mechanical properties of the part are enhanced under a variable magnetic field. Currently, variable or constant magnetic fields are provided by adding coils to the tip of the torch performing the process.

CN102950285, which is included in the known-state of the art, discloses an electromagnetic coil embedded in a worktable. Said document discloses effect of electromagnetic force on the molten pool.

CN105798299, which is included in the known-state of the art, discloses a magnetic device creating a magnetic field under the worktable, and multiple devices that create a magnetic field around the worktable, as well.

SUMMARY

Thanks to a production system according to the present invention, penetration is increased and heat flow is reduced by creating a constant magnetic field.

Another object of the present invention is to provide stirring and hitting effects by creating a variable magnetic field.

A further object of the present invention is to obtain a magnetic field in three different orientations by making coil windings in three different axes.

The production system realized to achieve the object of the invention, which is defined in the first claim and other claims dependent thereon, comprises at least one device used in additive manufacturing production methods of metal materials and enabling metal materials to be welded; at least one raw material used in metal additive manufacturing production methods; at least one feeder located on the device and allowing the raw material to deposit; at least one heat source on the device, which applies heat to the raw material provided by the feeder, so that the raw material is melted; at least one table on which the raw material provided by the feeder is deposited; a molten pool, e.g. the welding zone, which consists of the raw material melted on the table and obtained by melting the raw material coming from the feeder via the heat source; at least one piece formed by melting the raw material by means of a heat source, depositing it by creating a molten pool on the table, and welding the raw material in the molten pool; a plurality of magnetic generators on the device, which provide improvement in micro and/or macro structure of the part by applying a magnetic field on the part and/or molten pool by the user and/or by means of the control unit.

The production system according to the invention comprises magnetic generators located on the table, coaxial with each other and facing each other, such that a molten pool is located on each axis, facing each other and in accordance with the geometry of the deposited raw material, wherein a position the magnetic generators relative to each other and to the molten pool remains constant, wherein the magnetic generators create a magnetic field on the molten pool, thereby improving mechanical and metallurgical properties of the part thanks to both the welding process and the magnetic field.

In an embodiment of the invention, the production system comprises at least one actuator on the device; the magnetic generator powered by the activation of the actuator and as a result, creating a variable magnetic field on the molten pool, thereby creating a shock effect and stirring effect and improving mechanical and metallurgical properties of the part, wherein the magnetic generator enables the stirring effect to occur continuously, regardless of position of the table or each other, and without changing the magnetic field direction and/or magnetic field intensity.

In an embodiment of the invention, the production system comprises the device moving such that relative positions of the table and/or magnetic generators, which are rotated around their own axes by the trigger of the actuator, do not change relative to each other during and after rotation.

In an embodiment of the invention, the production system comprises an x-axis in which the winding direction of magnetic generators is located relative to the table; a y-axis in which the winding direction of other magnetic generators is at a right angle to the x-axis or at an angle predetermined by the user; a z-axis in which the winding direction of another magnetic generators is almost completely perpendicular to the table; the magnetic generator that creates a magnetic field in different orientations by rotating around the x-axis, y-axis and z-axis. It comprises magnetic generators with the same winding direction as each other on their axis.

In an embodiment of the invention, the production system comprises at least one control unit that keeps positions of the magnetic generators relative to the molten pool or to each other constant, regardless of movement of the table, and enables the power applied to the magnetic generators and the winding directions of the magnetic generators remain constant, thus enabling a continuous stirring effect in the molten pool.

In an embodiment of the invention, the production system comprises the control unit with a direction of the generated magnetic field being the same, which is opposite to each of the x-axis, y-axis and z-axis, and enables the continuous stirring effect created on the molten pool by their axes upon actuation of the actuator, such that their relative positions relative to each other are constant.

In an embodiment of the invention, the production system comprises the control unit which, if a position of one magnetic generator is changed, allows the user to adjust position of another magnetic generator relative to the other, thus keeping the relative distance between the two magnetic generators constant.

In an embodiment of the invention, the production system comprises the control unit that allows the user to adjust position of the magnetic generators depending on shape and size of the part.

In an embodiment of the invention, the production system comprises magnetic generators that move relative to the table as a result of the changes occurring in the molten pool according to the stirring effect.

In an embodiment of the invention, the production system comprises the table embedded in the table and serving as a stand-alone magnetic generator.

In an embodiment of the invention, the production system comprises magnetic generators with coil windings on three different axes, which are in a number determined by the user, depending on shape and size of the part.

In an embodiment of the invention, the production system comprises the device with six degrees of freedom (6DOF), thereby moving in different axes and allowing the production of parts with complex geometry.

In an embodiment of the invention, the production system comprises the device used for Directed Energy Deposition method.

BRIEF DESCRIPTION OF THE DRAWINGS

The production method realized to achieve the object of the invention is illustrated in the attached drawings, in which.

Figure 1:
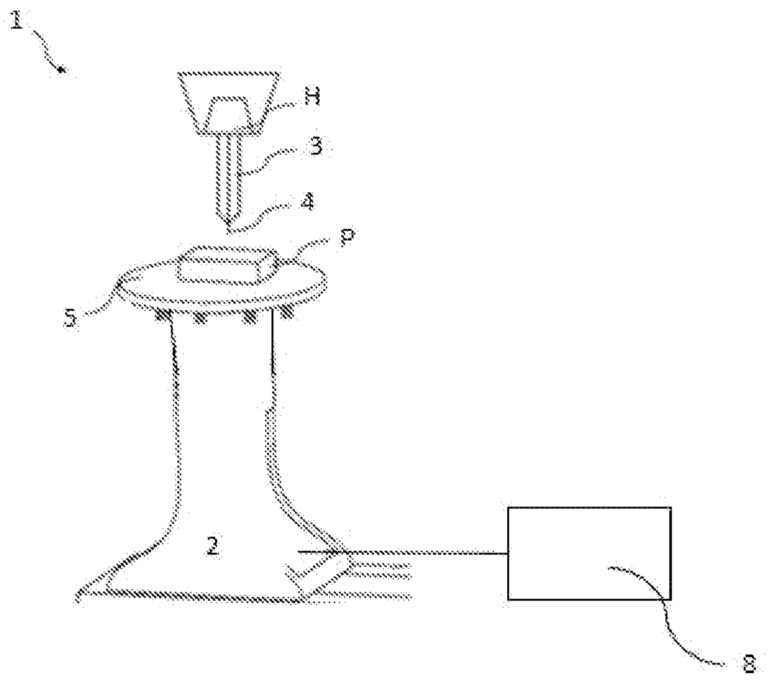
FIG. 1 is a schematic view of the production system.

All the parts illustrated in figures are individually assigned a reference numeral and the corresponding terms of these numbers are listed below:

1. Production System
2. Device
3. Feeder
4. Heat Source
5. Table
6. Magnetic Generator
7. Actuator
8. Control Unit
(K) Raw material
(P) Part
(K) Molten Pool
(X) x-axis
(Y) y-axis
(Z) z-axis

DETAILED DESCRIPTION

Figure 2:
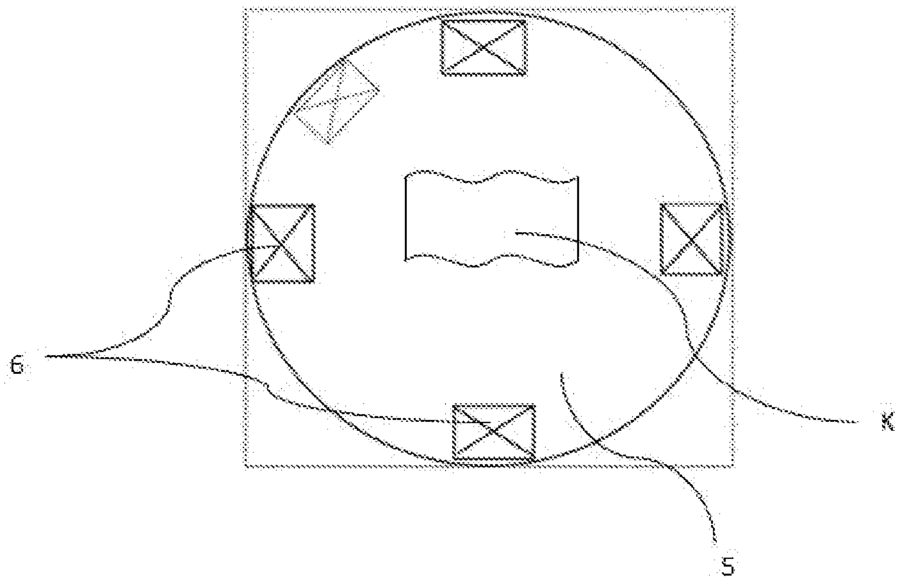
FIG. 2 is a perspective view of the table.

The production system (1) comprises at least one device (2) that enables application of the metal additive manufacturing production method and the welding process; at least one raw material (H) suitable for use in the metal additive manufacturing production method; at least one feeder (3) on the device (2), which enables deposition of the raw material (H); at least one heat source (4) on the device (2), which enables the raw material (H) provided by the feeder (3) to be melted; at least one table (5) that allows the raw material (H) to be processed thereon; a molten pool (K) formed by the raw material (H) melted on the table (5) by means of the heat source (4); at least one part (P) formed by melting the raw material (H) on the table (5) by means of the heat source (4) and by creating a molten pool (K) for processing the same; a plurality of magnetic generators (6) on the device (2), which provide improvement in micro and/or macro structure of the part (P) by applying a magnetic field on the part (P) (FIG. 1, FIG. 2).

Figure 3:
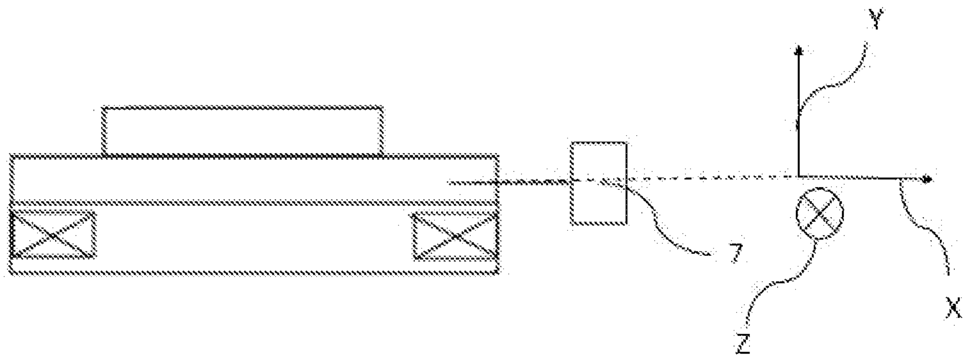
FIG. 3 is a front view of the table.

The production system (1) according to the invention comprises magnetic generators (6) on the table (5), one coaxial and opposite to the other, wherein the magnetic generators (6) have the molten pool (K) in between, thus creating a magnetic field on the molten pool (K) and improving mechanical and metallurgical properties of the part (P) (FIG. 3).

It comprises at least one device (2) suitable for use in metal additive manufacturing production methods for the welding process; at least one raw material (H) used in metal additive manufacturing production methods; at least one feeder (3) for the deposition of the raw material (H); at least one heat source (4) for melting the raw material (H) provided by the feeder (3); at least one table (5) on the device (2), which allows the raw material (H) received from the feeder (3) to be deposited and processed thereon; a molten pool (K) formed by melting the raw material (H) on the table (5) by means of the heat source (4); at least one part (P), wherein the raw material (H) deposited on the table (5) by the feeder (3) is melted by means of the heat source (4) to create a molten pool (K) for processing the same; a plurality of magnetic generators (6) on the device (2), which provide improvement in micro and/or macro structure of the part (P) by applying a magnetic field on the part (P) and/or molten pool (P). The feeder (3) deposits the raw material (H), e.g. a powder and/or a wire, on the table (5) to create parts (P). The raw material (H) melted by a heat source (4), e.g. a laser, is enabled to form a molten pool (K) on the table (5).

It comprises magnetic generators (6) located on the table (5) coaxially and opposite each other and improving mechanical and metallurgical properties of the part (P) by creating a magnetic field on the molten pool (K) located in between. Magnetic generators (6) enable the creation of a constant magnetic field. The magnetic generator (6) can continuously maintain the stirring effect created on the molten pool (K) when it moves. Magnetic generators (6) are positioned to be opposite each other on each axis, with the molten pool (K) in between, and their relative positions relative to each other do not change.

In an embodiment of the invention, the production system (1) comprises at least one actuator (7) located on the device (2); magnetic generators (6) which are powered by a trigger of the actuator (7), improve mechanical properties of the part (P) with the stirring effect by creating a variable magnetic field on the molten pool (K), and enable continuous stirring effect regardless of the position of each other and position of the table (5). Magnetic generators (6), which are powered depending on the current intensity applied by the actuator (7), create a variable magnetic field on the molten pool (K). The continuous stirring effect on the molten pool (K) or the part (P), regardless of the movement of the table (5) or each other, is ensured by magnetic generators (6).

In an embodiment of the invention, the production system (1) comprises the device (2) that enables relative positions of the magnetic generators (6) to be maintained when the table (5) and/or magnetic generators (6) triggered by the actuator (7) are rotated around their own axis. The magnetic generators (6) are positioned such that their relative positions do not change with respect to each other when the table (5) or magnetic generators (6) are rotated around their own axis.

In an embodiment of the invention, the production system (1) comprises an x-axis (X) with the winding direction on the table (5); a y-axis (Y) with the winding direction at a certain angle determined by the user relative to the x-axis (X); a z-axis (Z) with the winding direction at a certain angle predetermined by the user relative to the table (5); magnetic generators (6) that rotate around the x-axis (X), y-axis (Y) and z-axis (Z) to enable creation of magnetic fields in three different directions. It comprises the x-axis (X) with the coil winding direction on the table (5); the y-axis (Y) located almost at right angles to the x-axis (X) or at an angle predetermined by the user; the z-axis (Z) with the winding direction almost completely perpendicular to the table (5); magnetic generators (6) with windings around the x-axis (X), y-axis (Y) and z-axis (Z) to provide magnetic orientation in three different directions. The magnetic generators (6) have the same axis of coil winding direction as the other one.

In an embodiment of the invention, the production system (1) comprises at least one control unit (8) that enables power and relative positions of the magnetic generators (6) relative to each other and the molten pool (K) and the winding directions of the magnetic generators (6) to be constant, regardless of the movement of the table (5). The control unit (8) constantly maintains the stirring effect in the molten pool (K) without changing their relative positions relative to each other.

In an embodiment of the invention, the production system (1) comprises magnetic generators (6) located opposite each of the x-axis (X), y-axis (Y) and z-axis (Z), creating magnetic fields at the same direction, and moving relative to each other to maintain the stirring effect created by their axes on the molten pool (K) when they move through the actuator (7); the control unit (8) that enables relative positions of the magnetic generators (6) to be constant relative to each other. Even though the magnetic generators (6) move on their axis, the relative position of the magnetic generators (6) relative to the molten pool (K) does not change. The control unit (8) provides continuous stirring effect within a range determined by the manufacturer, without changing the stirring effect in the molten pool (K). Regardless of the movement of the table (5), a continuous stirring effect is provided in the molten pool (K). It comprises magnetic generators (6) that are activated depending on the molten pool (K), such that the winding directions are opposite each other on each axis, the molten pool (K) remains in between and their relative positions relative to each other do not change.

In an embodiment of the invention, the production system (1) comprises the control unit (8) that allows position of one magnetic generator (6) relative to another magnetic generator (6) to be adjusted as predetermined by the user. When the position of one magnetic generator (6) is changed, the position of another magnetic generator (6) is adjusted by the user via the control unit (8) so that the stirring effect does not change.

In an embodiment of the invention, the production system (1) comprises the control unit (8) that allows position of the magnetic generator (6) to be adjusted as predetermined by the user according to the size of the part (P). Position of the magnetic generators (6) is adjusted by the control unit (8) depending on the shape and/or size of the part (P).

In an embodiment of the invention, the production system (1) comprises magnetic generators (6) that move relatively on the table (5) depending on the change in the molten pool (K) due to the stirring effect. Depending on the effect of stirring effect on the molten pool (K), movement of the magnetic generators (6) while maintaining their relative positions is provided by the control unit (8).

In an embodiment of the invention, the production system (1) comprises the table (5), which is integrated with the magnetic generator (6) and creates a magnetic field by itself on the molten pool (K) by means of magnetic generators (6). Magnetic generators (6) embedded in the table (5) enable the table (5) to create a magnetic field on its own.

In an embodiment of the invention, the production system (1) comprises magnetic generators (6) that are wound on three different axes in a number predetermined by the user. The number of magnetic generators (6), which are coaxial and sequentially arranged on the table (5), can be increased depending on the characteristics of the part (P) to maintain the co-axis.

In an embodiment of the invention, the production system (1) comprises the device (2) creating a magnetic field in three dimensions due to six degrees of freedom (6DOF). Thanks to the device (2) moving in different axes, a part (P) with complex geometry can be created. In addition, each magnetic generator (6) and table (5) are enabled to have at least two degrees of freedom.

In an embodiment of the invention, the production system (1) comprises the device (2) used in Directed Energy Deposition method.

What is claimed is:

1. A production system (1) comprising:

at least one device (2) that enables application of the metal additive manufacturing production method and the welding process;

at least one raw material (H) suitable for use in the metal additive manufacturing production method;

at least one feeder (3) on the device (2), which enables deposition of the raw material (H);

at least one heat source (4) on the device (2), which enables the raw material (H) provided by the feeder (3) to be melted;

at least one table (5) that allows the raw material (H) to be processed thereon;

a molten pool (K) formed by the raw material (H) melted on the table (5) by use of the heat source (4);

at least one part (P) formed by melting the raw material (H) on the table (5) by use of the heat source (4) and by creating a molten pool (K) for processing the same;

a plurality of magnetic generators (6) on the device (2), which provide improvement in micro and/or macro structure of the part (P) by applying a magnetic field on the part (P), wherein the plurality of magnetic generators (6) are on the table (5), one coaxial and opposite to the other, wherein the magnetic generators (6) have the molten pool (K) in between, thus creating a magnetic field on the molten pool (K) and improving mechanical and metallurgical properties of the part (P);

at least one actuator (7) located on the device (2); and wherein the plurality of magnetic generators (6) are powered by a trigger of the actuator (7), improve mechanical properties of the part (P) with a stirring effect by creating a variable magnetic field on the molten pool (K), and enable continuous stirring effect regardless of the position of each other and position of the table (5); and at least one control unit (8) that enables power and relative positions of the magnetic generators (6) relative to each other and the molten pool (K), and the winding directions of the magnetic generators (6) to be constant, regardless of the movement of the table (5);

wherein the plurality of magnetic generators (6) are located opposite each of the x-axis (X), y-axis (Y) and z-axis (Z), creating magnetic fields at the same direction, and moving relative to each other to maintain the stirring effect created by their axes on the molten pool (K) when they are moved by the actuator (7); and wherein the control unit (8) enables relative positions of the magnetic generators (6) to be constant relative to each other.

2. The production system (1) according to claim 1, wherein the device (2) enables relative positions of the magnetic generators (6) to be maintained when the table (5) and/or magnetic generators (6) triggered by the actuator (7) are rotated around their own axis.

3. The production system (1) according to claim 1, comprising an x-axis (X) with the winding direction on the table (5); a y-axis (Y) with the winding direction at a certain angle determined by the user relative to the x-axis (X); a z-axis (Z) with the winding direction at a certain angle predetermined by the user relative to the table (5); and wherein the plurality of magnetic generators (6) rotate around the x-axis (X), y-axis (Y) and z-axis (Z) to enable creation of magnetic fields in three different directions.

4. The production system (1) according to claim 1, characterized by the control unit (8) that allows position of one magnetic generator (6) relative to another magnetic generator (6) to be adjusted as predetermined by the user.

5. The production system (1) according to claim 1, wherein the control unit (8) allows a position of the magnetic generator (6) to be adjusted as predetermined by the user according to the size of the part (P).

6. The production system (1) according to claim 1, wherein the plurality of magnetic generators (6) move relatively on the table (5) depending on the change in the molten pool (K) due to the stirring effect.

7. The production system (1) according to claim 1, wherein the table (5) is integrated with the magnetic generator (6) and creates a magnetic field by itself on the molten pool (K) by use of magnetic generators (6).

8. The production system (1) according to claim 1, wherein the plurality of magnetic generators (6) are wound on three different axes in a number predetermined by the user.

9. The production system (1) according to claim 1, wherein the device (2) creates a magnetic field in three dimensions due to six degrees of freedom (6DOF).

10. The production system (1) according to claim 1, wherein the device (2) is used in a Directed Energy Deposition method.

* * * * *